Oct. 1, 1968 | C. R. GREEN ETAL | 3,404,291

CONTROL CIRCUIT

Filed July 14, 1965

Inventors
C. R. GREEN
G. G. RYCHTYTZKYJ
BY Nicholas A. Cancasto
ATTY.

1

3,404,291

CONTROL CIRCUIT

Charles R. Green, Mount Prospect, and George G. Rychtytzkyj, Chicago, Ill., assignors to Admiral Corporation, Chicago, Ill., a corporation of Delaware Filed July 14, 1965, Ser. No. 471,804
3 Claims. (Cl. 307—239)

ABSTRACT OF THE DISCLOSURE

A high speed switching circuit held in a "ready" condition by the presence of a continuous signal of predetermined frequency and minimum amplitude. A pulse responsive load circuit is connected to a charged storage capacitor through the output of silicone controlled rectifier (SCR), the gate circuit of which is transistor controlled. A reverse bias is maintained across the control transistor to preclude false triggering of the SCR. Upon cessation of the signal, the control transistor rapidly fires the SCR discharging the capacitor into the pulse responsive output circuit.

This invention relates in general to control circuits and in particular to control circuits adapted to rapidly energize a load device responsive to generation of a trigger pulse.

The circuit of the invention may be employed with particular advantage in a recorder reproducer set, more commonly known by its military designation AN/GSH-6, wherein a very high speed tape recorder is set into operation upon disappearance of a holding control signal. However, it will be readily perceived that the circuit of the invention will find ready application in any environment requiring a very high speed "turn on" for initiating an output device.

The principal object of the invention is to provide a control circuit of very high speed switching capability.

A further object of this invention is to provide a high speed control circuit utilizing energy storage means in conjunction with a silicon controlled rectifier and a pulse initiated load device for rapidly energizing the load device at selected times.

In accordance with a preferred embodiment of the invention, a control circuit is provided including means for receiving a control signal of predetermined characteristics, means translating substantially only such control signals, utilization means, energy storage means, normally open switch means coupling the energy storage means and the utilization means, and means generating a trigger signal for rapidly closing the switch means to electrically connect the energy storage means and utilization means upon receipt of an appropriate signal.

Figure 1:
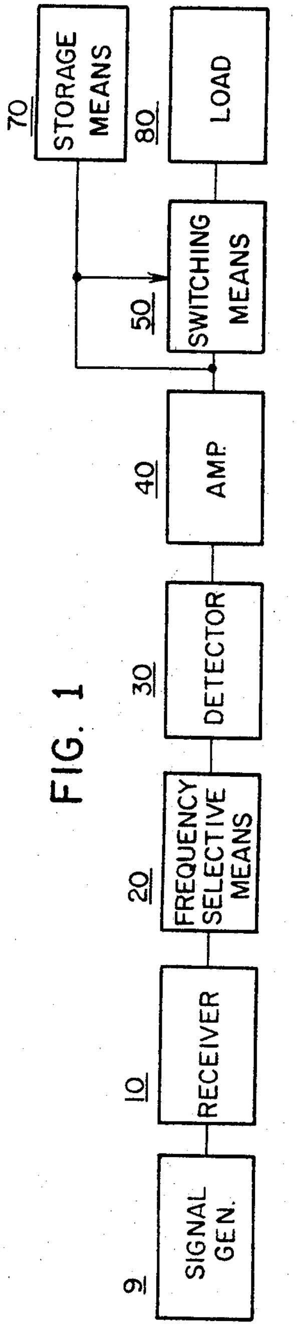
Figure 2:
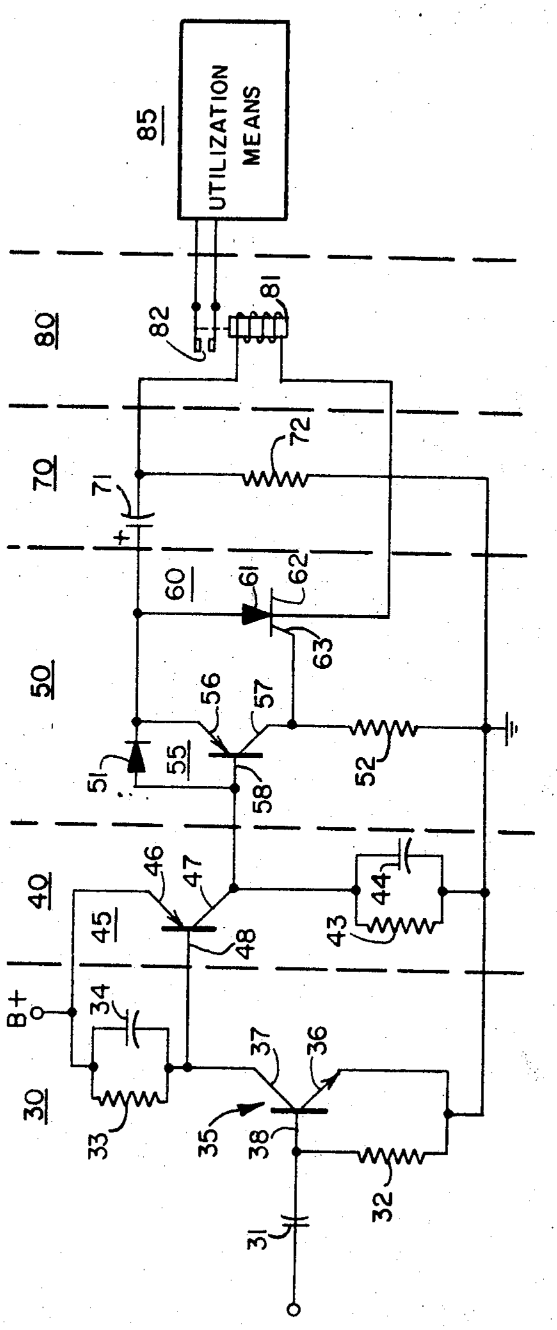

The invention will best be understood by reference to the accompanying drawings in which FIGURE 1 illustrates a block diagram of the control circuit of the invention and FIG. 2 illustrates, in schematic form, portions of the block diagram of FIG. 1.

Referring to FIG. 1, a signal generator 9 and a receiver 10 are illustrated. In the military equipment application referred to above, signal generator 9 comprises means generating a continuous signal of predetermined frequency and minimum amplitude and the receiver 10 includes compatible electronic equipment for reception of the transmittal signal. It will, of course, be understood by those skilled in the art that any form of generating and receiving means may be employed and the invention does not require the use of particular type energy signals.

2

Block 20, labeled Frequency Selective Means, includes circuitry for selectively amplifying signals received by receiver 10. Again referring to the military application of the invention, block 20 includes a limiter circuit and a highly selective frequency amplifier. This circuitry coacts to yield a high degree of noise immunity for discriminating against unwanted signals. The output of block 20 is coupled to a detector 30 which includes means for converting the received signal into a direct current signal of substantially constant amplitude. Detector 30 is coupled to amplifier 40 which raises the level of the direct current signal. The output of amplifier 40 is coupled to switching means 50 and storage means 70. Switching means 50 has a connection to a load circuit 80 and, as will be described with reference to FIG. 2, also includes circuitry for coupling storage means 70 to load 80 at selected times.

Briefly, the signal generated by signal generator 9 is translated by receiver 10, frequency selective means 20, detector 30, and amplifier 40 and is effective in allowing energy storage in storage means 70. While a signal is being received, switching means 50 acts to isolate storage means 70 from load 80. Upon disappearance of the signal output from signal generator 9, circuitry in switching means 50 becomes active for rapidly connecting storage means 70 to load 80, whereupon energy transfer occurs for energizing load 80. Thus it will be noted that, while most conventional control circuits operate upon reception of a control signal, the circuit of the invention is triggered on by the absence or disappearance of a control signal. Hence, it may be termed a "negative discharge circuit" as contrasted with a conventional discharge circuit.

Referring now to FIG. 2, a detailed schematic diagram of the blocks of FIG. 1 (from block 20 on) is shown. Dashed vertical lines are utilized to conveniently segregate the components of the schematic diagram into groups corresponding to the appropriately labeled blocks of FIG. 1. Hence, detector 30 includes a transistor 35 having an emitter electrode 36, a collector electrode 37, and a base electrode 38. A load circuit comprising a load resistor 33 and a parallelly connected signal frequency filter capacitor 34 is connected between a source of B+ potential and collector 37. Emitter 36 is grounded and transistor 35 is self-biased by bias resistor 32 connected from base 38 to ground. An input signal (from frequency selective means 20) is coupled via input capacitor 31 to base 38.

The components of detector 30 are selected such that transistor 35 is operating at cutoff during the absence of signal. The input signal is alternating and consequently rectification occurs in the base-emitter circuit of transistor 35 which gives rise to corresponding current flow in its emitter-collector circuit. Filter capacitor 34 tends to smooth out the collector-emitter current and a direct current potential change occurs at collector 37 when transistor 35 is driven conductive.

Transistor 35 is of the NPN type and is driven conductive when its base electrode is positive with respect to its emitter electrode. During the absence of signal collector 37 is at substantially B+ potential. Upon receipt of a signal and consequent conduction in transistor 35, collector 37 assumes substantially ground potential.

Collector 37 is connected to the base electrode 48 of transistor 45 (in amplifier 40) which also has an emitter electrode 46 and a collector electrode 47. This transistor is of the PNP type and requires a slightly positive potential gradient from its emitter to its base for conduction to occur. Thus, when collector 37 of transistor 35 is driven toward ground potential, a heavy forward bias is placed upon transistor 45 and conduction occurs. The load circuit for transistor 45 comprises a load resistor 43 and a filler capacitor 44 connected in parallel therewith, the entire combination being connected between collector 47 and ground. Upon conduction occurring in transistor 35 (and consequent conduction in transistor 45) collector electrode 47 of transistor 45 rises from substantially ground potential to substantially B+ potential.

Switching means 50 comprises a transistor 55 with a diode 51 connected between its emitter electrode 56 and base electrode 58, and a silicon controlled rectifier. Transistor 55 is also of the PNP type (thus requiring a positive potential gradient from emitter 56 to base 58 for conduction to occur). The polarity of diode 51 is such that a reverse bias is normally maintained across the emitter-base junction of transistor 55. Collector 57 is connected to ground through a load resistor 52 and is further connected to a gate electrode 63 on silicon controlled rectifier 60.

Silicon controlled rectifier 60 is a switched semiconductor device of a type well known in the art. Such device includes an anode and cathode, as in any conventional diode, plus an additional electrode which serves as a gate. The silicon controlled rectifier only acts like a diode when a predetermined potential is applied to its gating electrode. At other times it appears as an open circuit. It will of course be noted that the above only holds true when the silicon controlled rectifier is operated within its design parameters.

Energy storage means 70 comprises a capacitor 71 having one terminal connected to anode 61 of silicon controlled rectifier 60 and emitter 56 of transistor 55 and its other terminal connected to ground through a resistor 72. A connection is also provided between capacitor 71 and the winding of a relay 81 which is part of load circuit 80. The other end of the winding of relay 81 is connected back to cathode 62 of the silicon controlled rectifier. Thus, relay 81 and capacitor 71 are in a series circuit including the anode-cathode path of silicon controlled rectifier 60.

Assuming for the moment that capacitor 70 is discharged and that no signal is present at capacitor 31, the potential of collector 37 is substantially B+ and the potential of collector 47 is at ground. Transistor 55 is thus not in conduction. Assuming now, the presence of a signal at capacitor 31, collector 37 goes to ground potential, collector 47 rises to substantially B+ potential, and diode 51 conducts. This leads to two things. First, capacitor 71 begins to charge over a circuit including B+, emitter 46, collector 47, diode 51, capacitor 71, resistor 72, and ground. Second, conduction in diode 51 is accompanied by a potential drop across its anode-cathode terminals which effectively insures that transistor 55 is reverse biased. Therefore, in the presence of signal, transistor 55 is maintained non-conductive. As capacitor 71 achieves a fully charged condition, the potential across its terminals assumes near B+ value in the polarity indicated. This potential rise is in a direction conducive to conduction in silicon controlled rectifier 60, but this device is inhibited by the presence of ground potential on its gate electrode 63.

Assuming now that the signal supplied to the base of transistor 35 is removed, transistor 35 immediately reverts to its non-conductive condition which causes a positive voltage swing on collector 37 for driving transistor 45 non-conductive. Upon transistor 45 being turned off, its collector potential falls to ground and base 58 of transistor 55 is now at ground potential whereas its emitter 56 is at a positive potential equal to that across capacitor 71. Transistor 55 is thereupon immediately driven into heavy conduction and collector 57 rises from ground potential toward the potential to which capacitor 71 is charged. Thus a large positive energy pulse is applied to gate 63 of silicon controlled rectifier 60 which rapidly switches this device into a conductive state. Capacitor 71, now rapidly discharges through the anode-cathode path of silicon controlled rectifier 60 into load circuit 80 (which in this instance is relay 81). Relay 81 closes a set of contacts 82 and conditions utilization means 85.

The discharge of capacitor 71 into the inductive circuit of relay 81 results in an oscillation which quickly cuts off silicon controlled rectifier 60 during the negative portion of the oscillatory cycle. Simultaneously, transistor 55 is driven out of conduction when its emitter goes negative with respect to its base, the positive potential present on gate 63 disappears, and the silicon controlled rectifier is rapidly restored to its non-conductive state. The discharge time constant for the circuit including capacitor 71 is very small whereas its charge time constant is quite large. Consequently, the switching circuit restores quickly and is prevented from spurious multiple operation since the energy stored in capacitor 71 is not rapidly replenished.

What has been described is a novel high speed control circuit. It is recognized that numerous departures from and modifications of the disclosed embodiment may be readily apparent to those skilled in the art. The invention embraces all such modifications within its true spirit and scope as defined in the claims.

The embodiments of the invention in which an exclusive property or privilege is claimed are defined as follows:

1. In combination with a continuous signal of predetermined frequency and minimum amplitude; a transistor detector adapted for converting said continuous signal into a direct current signal; a transistor amplifier coupled to said transistor detector amplifying said direct current signal; a pulse forming network including a transistor having an emitter, a collector, and a base; means coupling said base to the output of said transistor amplifier; unilateral conducting means connected between said base and said emitter; a storage capacitor coupled across said emitter and said collector, said storage capacitor storing energy responsive to said continuous signal; a silicon controlled rectifier including an anode, a cathode, and a gate, said gate being connected to said collector and said anode being connected to said emitter; a pulse initiated output circuit serially connected in circuit with said capacitor and anode-cathode circuit of said silicon controlled rectifier whereby, upon cessation of said continuous signal, said transistor generates a trigger pulse at said collector for gating on said silicon controlled rectifier, said energy storage capacitor discharging through the anode-cathode circuit of said silicon controlled rectifier into said pulse initiated load circuit.

2. In combination with a continuous signal of predetermined frequency and minimum amplitude; amplitude and frequency selective transistor detector means converting said continuous signal into a direct current signal; a transistor amplifier coupled to said transistor detector amplifying said direct current signal, said transistor amplifier having an output terminal; a pulse forming network including a transistor having an input circuit and an output circuit; a storage capacitor; a diode connected between said storage capacitor and said output terminal; means coupling said input circuit across said diode for maintaining a reverse bias across said input circuit during presence of said continuous signal, said storage capacitor being supplied energy through said diode responsive to said continuous signal; a silicon controlled rectifier including a gate circuit and a main conduction circuit, said gate circuit being connected across said output circuit; a pulse initiated load circuit serially connected to said capacitor and said main conduction circuit of said silcon controlled retifier whereby upon cessation of said continuous signal said transistor is driven conductive and generates a pulse in said output circuit for gating on said silicon controlled rectifier, said energy storage capacitor discharging, through said main conduction circuit of said silicon controlled rectifier, into said pulse initiated load circuit.

3. In combination with a continuous signal of predetermined frequency and minimum amplitude; means translating substantially only signals of said predetermined frequency and minimum amplitude; a transistor detector converting said continuous signal into a direct current signal, a transistor amplifier including filter means coupled to said transistor detector for amplifying said direct current signal, said transistor amplifier having an output terminal; a trigger pulse forming network including a transistor having an emitter-base input circuit and emitter-collector output circuit; an electrolytic capacitor, a semiconductor diode connected between said electrolytic capacitor and said output terminal, said emitter-base input circuit being connected in parallel with said semi-conductor diode for maintaining a reverse bias on said transistor during presence of said continuous signal, said electrolytic capacitor being supplied energy through said semiconductor diode responsive to said continuous signal; a silicon controlled rectifier including an anode, a cathode, and a gate, said anode and said gate being connected across said emitter-collector output circuit; a pulse energizable relay serially connected with said electrolytic capacitor and the anode-cathode circuit of said silicon controlled rectifier whereby upon termination of said continuous signal said transistor is driven conductive and generates a trigger pulse in said output circuit for gating on said silicon controlled rectifier, said electrolytic capaictor discharging through said anode-cathode circuit into said pulse energizable relay.

References Cited

UNITED STATES PATENTS

| | | | |
|---|---|---|---|
| 2,855,544 | 10/1958 | Germeshausen | 328—210 |
| 2,965,855 | 12/1960 | Ketchledge | 307—88.5 |
| 3,032,685 | 5/1962 | Loomis | 307—88.5 |
| 3,049,642 | 8/1962 | Quinn | 307—88.5 |
| 3,242,420 | 3/1966 | Ulrey | 307—88.5 |

ARTHUR GAUSS, *Primary Examiner.*

B. P. DAVIS, *Assistant Examiner.*